United States Patent [19]

Sauerwein et al.

[11] Patent Number: 4,765,054

[45] Date of Patent: * Aug. 23, 1988

[54] METHOD OF MAKING A FIELD SUBASSEMBLY

[75] Inventors: William D. Sauerwein, Westminster; John E. Dibbern, Jr., Street, both of Md.; Frank J. O'hara, Hanover, Pa.; Robert G. Moores, Jr., Reisterstown, Md.

[73] Assignee: Black & Decker, Inc., Newark, Del.

[*] Notice: The portion of the term of this patent subsequent to Apr. 1, 2003 has been disclaimed.

[21] Appl. No.: 846,566

[22] Filed: Mar. 31, 1986

Related U.S. Application Data

[62] Division of Ser. No. 636,367, Jul. 31, 1984, Pat. No. 4,578,852, which is a division of Ser. No. 522,011, Aug. 11, 1983, Pat. No. 4,484,096.

[51] Int. Cl.[4] ............................................. H02K 15/10
[52] U.S. Cl. ........................................ 29/596; 310/50; 310/71; 310/217
[58] Field of Search ................... 29/596, 598; 310/50, 310/71, 194, 260, 217

[56] References Cited

U.S. PATENT DOCUMENTS

| | | | |
|---|---|---|---|
| 1,115,440 | 10/1914 | Kunkel | 310/217 X |
| 2,688,103 | 8/1954 | Sheldon | 310/194 X |
| 3,378,711 | 4/1968 | Swanke | 310/194 X |
| 3,476,960 | 11/1969 | Rees | 310/50 |
| 4,038,573 | 7/1977 | Hillyer | 310/71 |
| 4,123,678 | 10/1978 | Jacoby | 29/596 X |
| 4,322,647 | 3/1982 | Neroda et al. | 310/71 |
| 4,339,871 | 7/1982 | Magnaghi | 29/596 |
| 4,340,829 | 7/1982 | McCoy | 310/71 |
| 4,578,852 | 4/1986 | Sauerwein et al. | 29/596 |

FOREIGN PATENT DOCUMENTS

| | | |
|---|---|---|
| 010339 | 4/1980 | European Pat. Off. |
| 2470470 | 5/1981 | France |
| 336961 | 10/1930 | United Kingdom |
| 626118 | 7/1949 | United Kingdom |
| 775807 | 5/1957 | United Kingdom |
| 941455 | 11/1963 | United Kingdom |
| 965984 | 8/1964 | United Kingdom |
| 1061569 | 3/1967 | United Kingdom |
| 1195659 | 6/1970 | United Kingdom |
| 1201629 | 8/1970 | United Kingdom |
| 1216836 | 12/1970 | United Kingdom |
| 1406645 | 9/1975 | United Kingdom |
| 1409236 | 10/1975 | United Kingdom |
| 1437718 | 6/1976 | United Kingdom |
| 1482470 | 8/1977 | United Kingdom |
| 1485252 | 9/1977 | United Kingdom |
| 1490255 | 10/1977 | United Kingdom |
| 2002970 | 2/1979 | United Kingdom |
| 2033670 | 5/1980 | United Kingdom |
| 2034532 | 6/1980 | United Kingdom |
| 1574986 | 9/1980 | United Kingdom |

Primary Examiner—Carl E. Hall
Attorney, Agent, or Firm—Charles E. Yocum; Dennis A. Dearing; Edward D. Murphy

[57] ABSTRACT

A field subassembly is assembled by positioning two coil supports adjacent respective core end faces of a ferromagnetic core. The core-engaging surfaces of the coil supports and the core end faces have respective surfaces which are uninterrupted by projections. During the assembly of the field, fasteners are pushed into the respective coil supports and the core such that the fasteners engage mounting holes in the coil support with a press-fit. After the field is wound, a brush holder subassembly is also pressed onto the fasteners and the resultant core subassembly is connected to a field housing by driving the fasteners in a conventional fashion. In the preferred embodiment, the fasteners provide a three-point contact with mounting holes formed in the coil supports and the brush holder subassembly. This enables the fasteners to maintain the coil supports and the brush holder subassembly in alignment with the core while shearing a minimum of material from the coil supports and brush holder subassembly when the fasteners are pushed into their respective mounting holes. Then, the same fasteners remain with the subassembly to connect the field subassembly to the field housing.

19 Claims, 6 Drawing Sheets

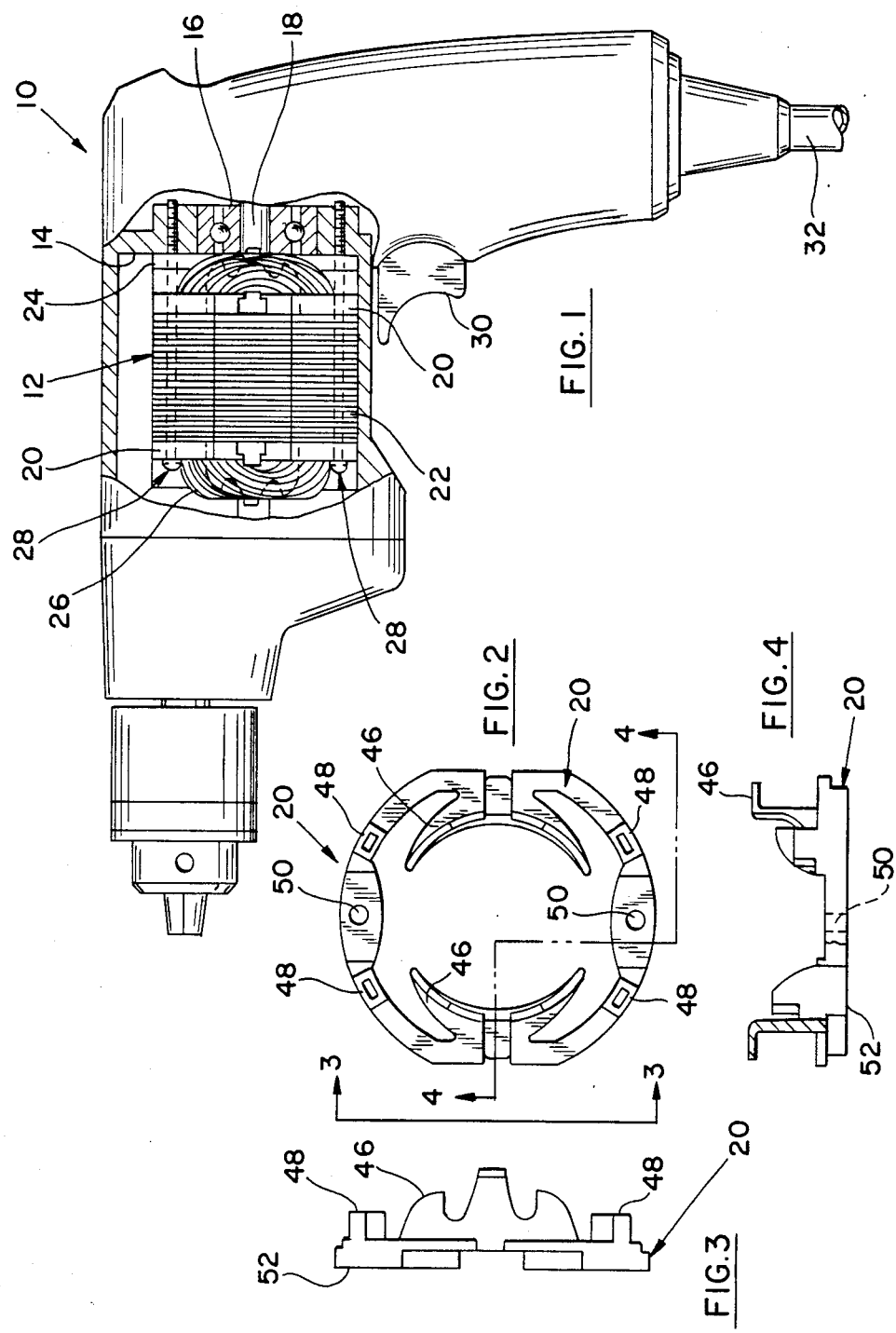

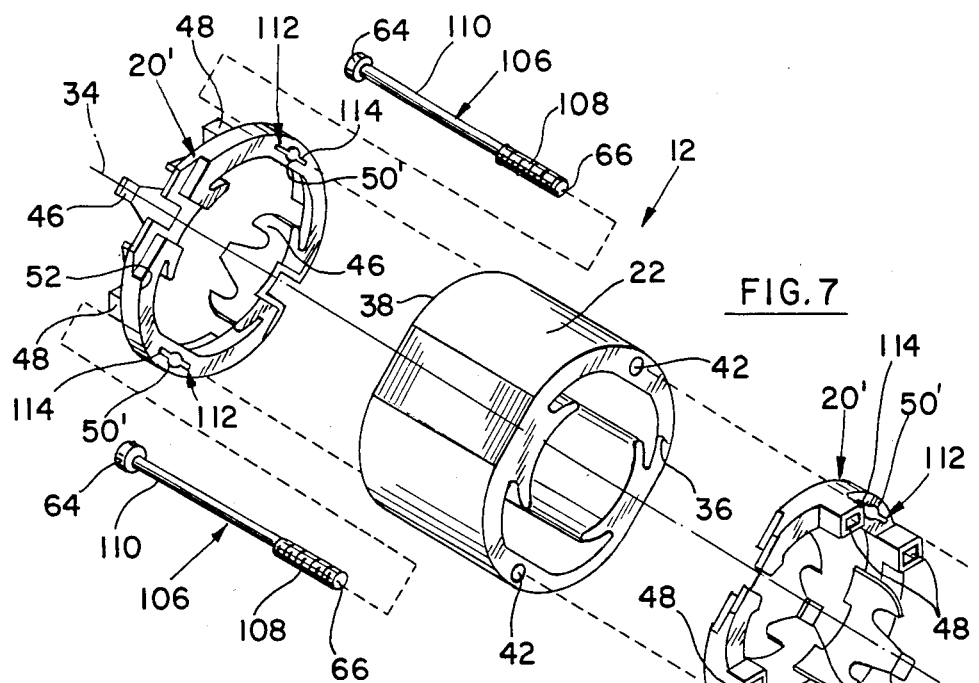
FIG. 7
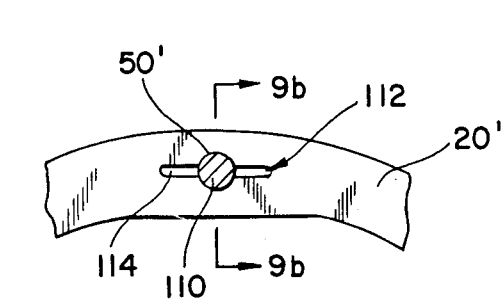
FIG. 8a
FIG. 8b
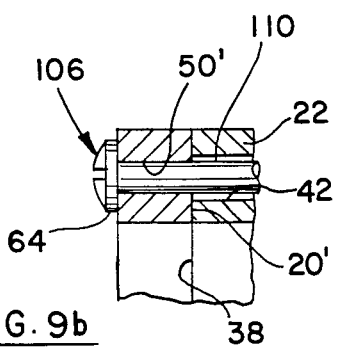
FIG. 9a
FIG. 9b

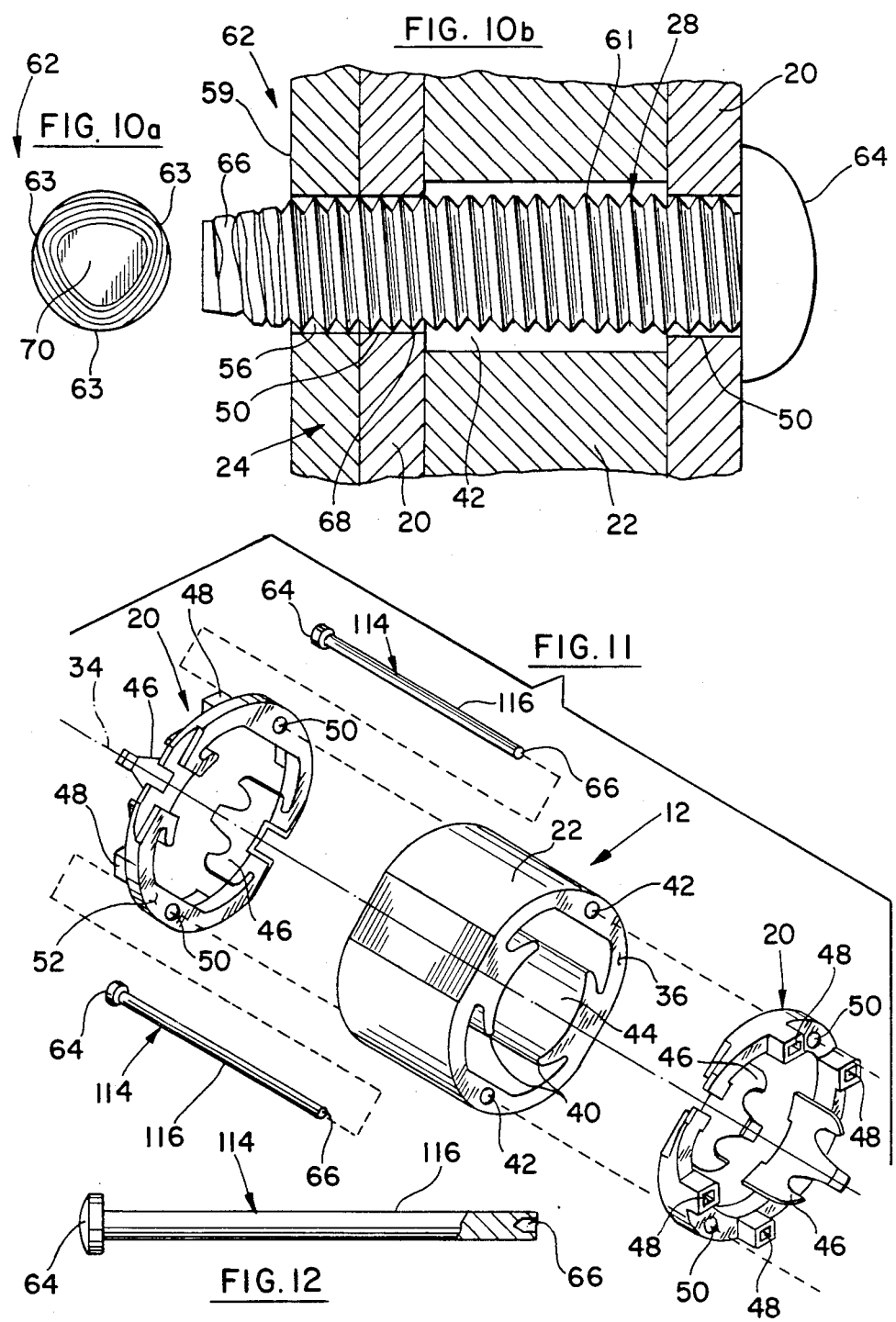

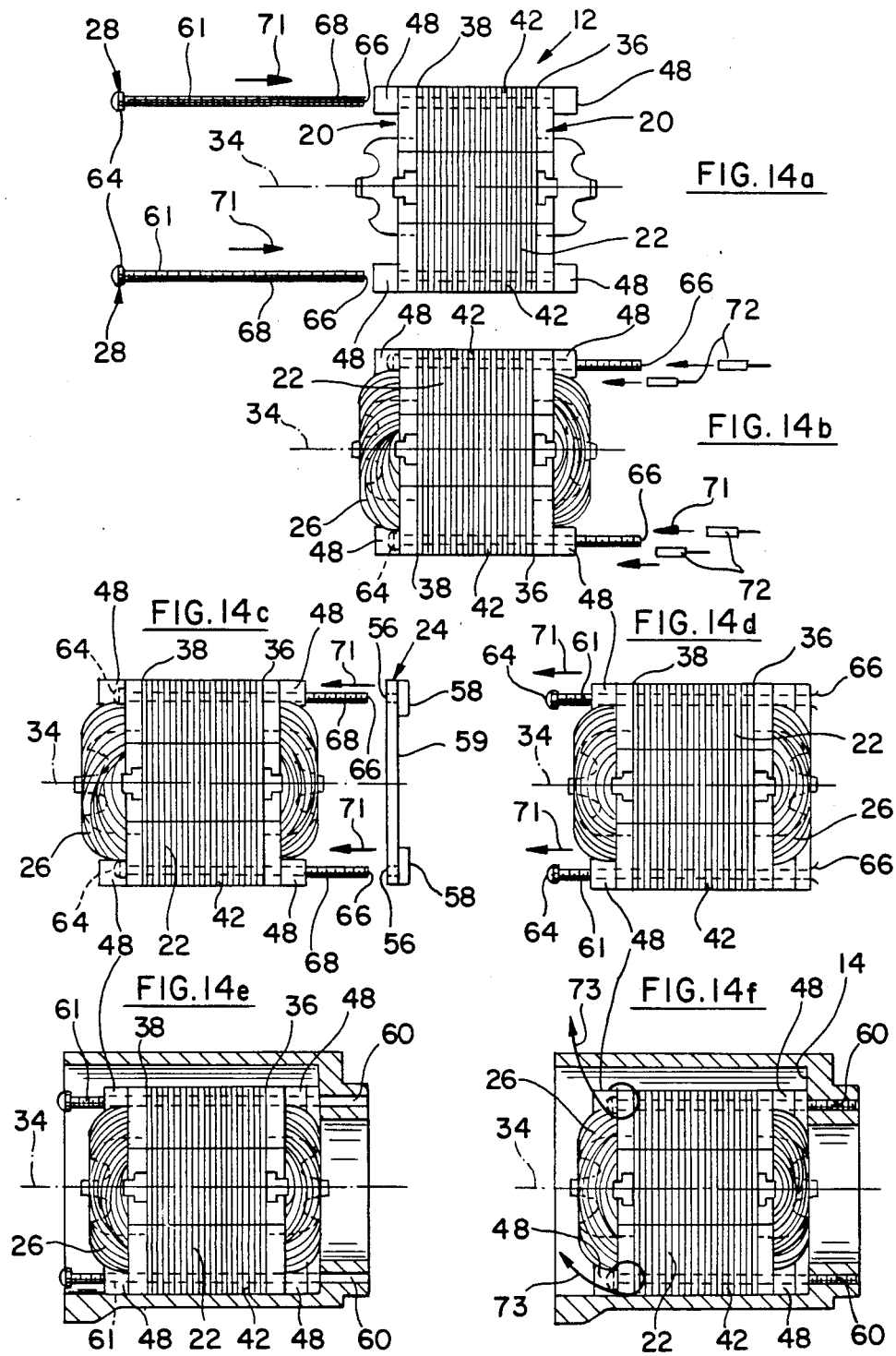

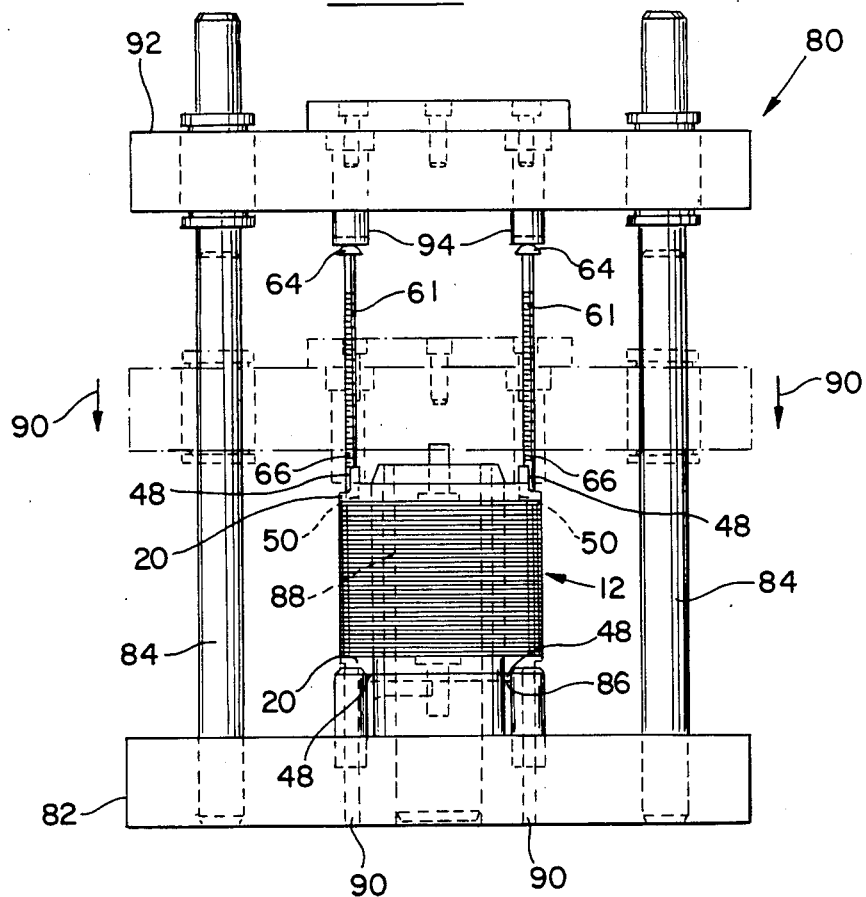
FIG. 13
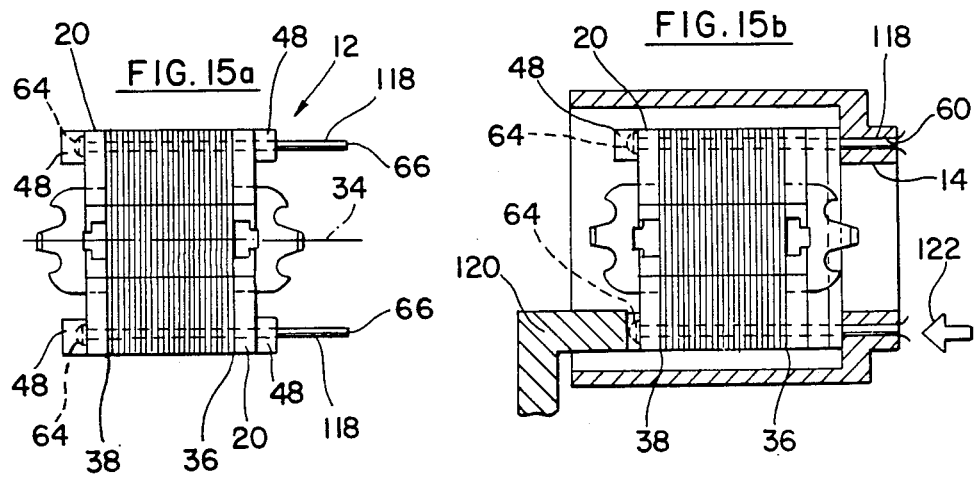
FIG. 15a
FIG. 15b

METHOD OF MAKING A FIELD SUBASSEMBLY

This is a division of application Ser. No. 636,367 filed July 31, 1984, now U.S. Pat. No. 4,578,852, issued Apr. 1, 1986; which is a division of application Ser. No. 522,011, filed Aug. 11, 1983, now U.S. Pat. No. 4,484,096, issued Nov. 20, 1984.

BACKGROUND OF THE INVENTION

1. Field of the Invention

This invention relates to field subassemblies for electric motor-powered devices, including power tools, and a method for assembling the field subassemblies. In particular this invention relates to a field subassembly in which subassembly elements such as insulating members or coil supports are aligned in a predetermined orientation with a ferromagnetic core by fasteners which are pushed, instead of threaded, into the subassembly elements. With the fasteners in place, and after the field has been wound, a brush holder subassembly is pressed onto the fasteners yielding a core subassembly; the entire core subassembly is then attached to the field housing using the same fasteners.

2. Description of the Prior Art

When it is desired to provide a coil support for the core of a field so that adjacent windings of field coil wire are supported during the winding operation, it is necessary that the coil supports be maintained in a predetermined relation to the core. Among the systems used to maintain the coil support in this predetermined relation are those which use a coil support having a plurality of holes formed therein corresponding to the holes used to align the laminations in the stack forming the core. In such a system, bolts are inserted in a conventional manner through the holes in the coil support and through the stack alignment holes, and the core is subsequently wound with field coil wire. Another system uses projections extending outwardly from the core-engaging face of a coil support to engage holes in the ferromagnetic core. Then the field is wound with the field coil wire; bolts or other fasteners are inserted into the core, and the subassembly is subsequently connected to a housing.

A third system uses bolts inserted in a conventional (rotating) manner into the openings formed in the pads in a motor housing and through the respective through-openings in the stacks of laminations. The bolts, however, are not inserted until after the field has been wound, and no coil supports are attached.

It can therefore be seen that up to the present, a set of fasteners has been used either in the early stages of the field assembly process or at the final stages; but the same set has not been carried with the field stack throughout the entire subassembly process. Thus at least two set of fasteners are inserted and locked in place, thereby requiring that at least one set be totally removed from the subassembly during the process. The present invention bridges that gap by using the same set of fasteners throughout the entire process, ultimately including the step of attaching the core to a mounting member. Thus the middle steps of removal and replacement of at least one set of fasteners are eliminated. Furthermore, the present invention permits an insulating member such as coil support to double as a female fastener member, in the fasteners are pushed, not rotated, into engagement with the coil support with a press-fit, thereby locking the fasteners in place.

SUMMARY OF THE INVENTION

A field subassembly includes a ferromagnetic core defining a longitudinal axis and having first and second axial end faces uniterrupted by projections. A pair of coil supports are connected to the axial end faces by connecting means for maintaining the coil supports in a predetermined relation to the respective core end faces and for attaching the field subassembly to a field housing member. In the preferred embodiment, the connecting means include a plurality of fasteners having a trilobular annular cross-section at their threaded portions, and which engage the coil supports with a press-fit.

It is an object of the present invention to provide a field subassembly for an electric motor-driven device, and a method for its assembly, which overcomes the prior art disadvantages; which is simple, economical and reliable; which enhances opportunities for automated assembly; which includes a first subassembly element formed of electrically-insulating material, having a plurality of coil-supporting portions, and having a core-engaging surface uninterrupted by projections mounted in a predetermined relation to the axial end face of the ferromagnetic core; which core defines a plurality of pole pieces and through-holes; which subassembly element or insulating member further includes a plurality of field terminal support portions and mounting holes, the mounting holes, coil support portions, and field terminal support portions being angularly located on the coil supports in a predetermined relationship to the respective core end faces; which predetermined relationship is maintained for at least the subsequent step of winding the field by connecting means for maintaining the insulating member in alignment with the respective core end faces and for attaching the field subassembly to a field housing member; which connecting means include elongated fasteners having headed and non-headed ends; which further have means for engaging the insulating member mounting holes with a three-point contact and press-fit; which means include a threaded portion formed at a non-headed end with a tri-lobular annular cross-section, such that a minimum of material is removed from the insulating member when the fasteners are pressed therein; which fasteners are pushed axially into the ferromagnetic core from the end opposite the end at which the insulating member is located; which fasteners are inserted such that a portion of the threaded portion extends outwardly from the insulating member; which, together with respective core pole pieces, are wound with lengths of field coil wire so that the field coil wire is electrically insulated from the core; subsequent to which field terminals are inserted in respective field terminal support portions; which field terminals are electrically connected to respective ends of the field coil wire, adjacent loops of which being bonded together; which wound field is further provided with a brush holder subassembly having mounting holes which engage the fastener threaded portions with a press-fit, thereby forming a core subassembly; which fasteners are then pushed inwardly through the core with an axial motion until the non-headed ends of the fasteners are substantially flush with an exterior surface of the brush holder subassembly; which subassembly is then connected to a field housing by driving the fasteners into the field case with a conventional rotating motion.

BRIEF DESCRIPTION OF THE DRAWINGS

The invention is illustrated in the accompanying drawings in which:

FIG. 1 is a side elevational view of a power tool including a field subassembly embodying the present invention.

FIG. 2 is a top plan view of the coil support of the present invention.

FIG. 3 is a side elevational view of the coil support, taken along line 3—3 of FIG. 2.

FIG. 4 is an elevational sectional view of the coil support of the present invention, taken along the line 4—4 of FIG. 2.

FIG. 7 is a exploded perspective detail view of a fourth embodiment of the present invention illustrating the use of fastener compensating means on the coil supports.

FIG. 8a is an enlarged elevational detail view of the fastener of FIG. 7, with the threaded portion engaging the fastener compensating means on the coil support.

FIG. 8b is a side elevational sectional view taken along the line 8b—8b of FIG. 8a.

FIG. 9a is an enlarged elevational detail view partially in section of the fastener compensating means contracting about the non-threaded portion of the fastener.

FIG. 9b is an elevational sectional detail view taken along the line 9b—9b of FIG. 9a.

FIG. 10a is an enlarged elevational detail view of the non-headed end of a tri-lobular fastener taken along the line 10a—10a of FIG. 5.

FIG. 10b is an enlarged elevational schematic detail view, partially in section, of the tri-lobular fastener of FIG. 10a assembled into the field subassembly.

FIG. 11 is an exploded perspective detail view of a fifth embodiment of the present invention, showing the use of rivets.

FIG. 12 is an enlarged elevational detail view of the fastener of FIG. 11.

FIG. 13 is a simplified elevational view of the apparatus used for assembling a portion of the field subassembly of the present invention.

FIGS. 14a thru 14f are elevational sequential schematic detail views of the preferred method of assembling the field subassembly of the present invention, in which:

FIG. 14a shows the coil supports positioned on the core and the fasteners being pushed into the subassembly using an axial motion;

FIG. 14b illustrates the field after being wound with the field core wire, with the field terminals being inserted in terminal support portions formed on the coil support;

FIG. 14c shows a brush subassembly being pushed onto the fasteners using an axial motion;

FIG. 14d illustrates the step of pushing the fasteners in the reverse direction until the non-headed ends are flush with an exterior surface of the brush holder subassembly;

FIG. 14e shows the resultant core subassembly positioned adjacent a field housing member; and FIG. 14f shows the fasteners connecting the field to the field housing member using a conventional rotating or driving motion.

FIG. 15a is an elevational schematic detail view of the subassembly shown in FIG. 11.

FIG. 15b is an elevational detail schematic view of the process for assembling the subassembly shown in FIG. 15a to a field housing member.

DESCRIPTION OF THE PREFERRED EMBODIMENT

Figure 5:
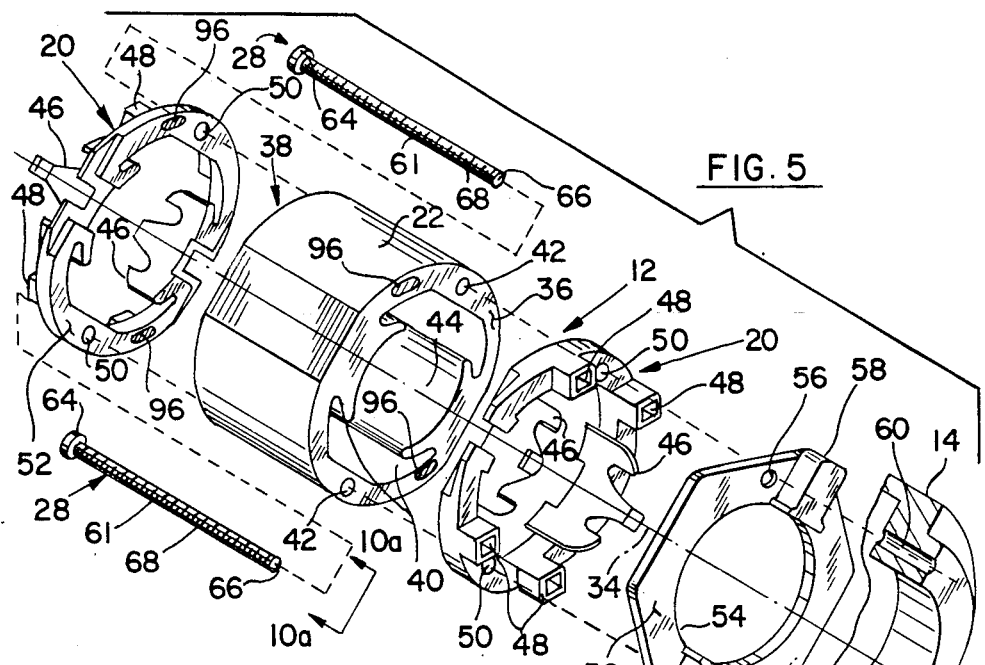
FIG. 5 is an exploded perspective detail view of the field subassembly of the present invention with portions omitted for clarity, showing the preferred embodiment in which fasteners interconnect the subassembly, and showing a second embodiment in which adhesive connects the coil supports to a ferromagnetic core.

In FIG. 1 an electric motor-powered device such as a power tool is referred to generally as 10 and is shown embodying the field subassembly of the present invention. The power tool includes a field subassembly 12, a field housing member 14 supporting a bearing 16 and a rotor (not shown) rotatably mounted within the field and having a shaft 18 journaled in the bearing 16. The field subassembly 12 includes a pair of first field subassembly elements such as insulating members, or coil supports 20, a ferromagnetic core 22 typically formed as a stack of steel laminations, and a second subassembly element such as brush holder subassembly 24, which is located intermediate one of the coil supports 20 and the field housing 14. As shown in FIG. 1, the field is wound with a length of field core wire 26 about a portion of the core 22 and about the coil supports 20. The field subassembly 12 is attached to the field housing member 14 by the connecting means 28 of the present invention in a manner which will be described later. The field subassembly 12 and the rotor are electrically connected to a switch 30 and a line cord 32 in any suitable manner.

Now referring to FIGS. 2 through 5, the elements of the field subassembly 12 of the present invention are shown in greater detail. The ferromagnetic core 22 of FIG. 5 defines a longitudinal axis 34, first and second axial end faces 36, 38 which are uninterrupted by projections extending therefrom, two pole pieces 40, two through-holes 42 and a central opening or rotor bore 44. The first subassembly elements (coil supports 20) include a pair of coil supporting portions 46 and are aligned in predetermined relation to the core 22 such that the coil supporting portions 46 are angularly aligned with the pole pieces 40. The coil supports further include a plurality of field terminal support portions 48 and two mounting holes 50, also in predetermined relation to the core 22. The coil supports 20 are shaped to be substantially congruent with the respective core axial end faces, 36, 38 and include core-engaging surfaces 52 which are also uninterrupted by projections extending therefrom. The coil supports 20 are made of an electrically insulating material and can be molded as a one-piece plastic member. A second subassembly element, the brush holder subassembly 24, includes a brush mounting member 54 defining a pair of mounting holes 56, a pair of brush holders 58, and an exterior surface 59. Also as shown in FIG. 5 the field housing member 14 defines two mounting structures 60 which accept the connecting means 28. Although this subassembly 12 (as illustrated in FIG. 5) shows two connecting means 28 in engagement with through-holes 42, mounting holes 48 and 56, and mounting apertures 60, it should be noted that if desired, the subassembly may be constructed using only a single mounting hole or aperture, respectively, formed in the various subassembly elements, in which case only one connecting means 28 need be furnished. Likewise, the insulating members 20 may be formed with less than two coil supporting portions 46, and less than two field terminal support portions 48. It is the means by which the above-noted elements of the field subassembly are interconnected which forms the essence of this invention; it can therefore be appreciated that any type of field subassembly member may be interconnected using such means, as will now be described.

The method for assembling the field subassembly 12 of the present invention can be briefly outlined as follows:

With reference to FIGS. 5 and 14a through 14f, the coil supports 20 are maintained aligned in predetermined relation on the core 22 by connecting means 28, including a pair of elongated fasteners 61. However, the fasteners are not threaded or rotated into the core 22 and coil supports 20, but are instead passed axially through the subassembly, and the core 22 is then wound with the field coil wire 26. The fasteners 61 remain with this core subassembly 12 throughout the rest of the field assembly process. When it is time to connect the core subassembly 12 to the field housing member, the same fasteners are then driven into the field housing member 14 or field case with a conventional rotating or driving motion. Thus conventional intermediate steps relating to multiple insertion and removal of the field subassembly fasteners have been eliminated.

Therefore, in the preferred embodiment shown in FIG. 5, these fasteners 61 are included in connecting means 28 for maintaining the insulating members or coil supports 20 in predetermined relation to the core 22 and for attaching the field or core subassembly 12 to the field housing member 14. However since the connecting means 28 are pressed axially into the plastic coil support 20 as shown in FIG. 14a, it is desirable that the connecting means 28 be structured to minimize the amount of plastic sheared from the respective coil supports 20. In view of the annular shape of the coil support mounting holes 50 and of the objective of aligning the coil support 20 with respect to the core 22, the present invention further includes the use of alignment means 62 for maintaining a three-point contact 63 with the respective coil support mounting holes 50, as shown in detail in FIGS. 5, 10a and 10b. In FIG. 5, the fastener 61 has a headed end 64 and a non-headed end 66. The fastener 61 further includes a threaded portion 68 which is adjacent the non-headed end 66 and which in the preferred embodiment extends substantially the length of the fastener 61. However it will be appreciated that the primary importance of the connecting means 28 is to maintain the predetermined relationship of the coil support 20 located at the first core axial end face 36, nearest the area of electrical connections. Therefore the threaded portion 68 need not extend along the entire length of the fasteners 61. It need only have a cross-sectional dimension such that it engages the coil support mounting holes with a press-fit and moves freely in the core through-holes.

With particular reference to FIGS. 10a and 10b, the alignment means 62 includes a rolled-threaded portion 68 on the fastener 61 adjacent the respective non-headed end 66 and having a known tri-lobular, annular cross-section 70. Of course other alignment means which achieve the same effect are acceptable, such as a fastener having a shank with a triangular cross-section.

Again with respect to FIGS. 5, 10a and 10b, the assembly procedure outlined above is equally applicable, if it is desired that only one subassembly element or member 20 be mounted adjacent the core end face nearest the brushes or other electrical connection portions of the electrical device. Again that is because one of the significant features achieved by the subassembly 12 of the present invention is the use of the member 20 adjacent the first core axial end face 36 to double as an anchor holding the inserted fasteners 61 in place, thereby eliminating the conventional requirement for female fasteners. Thus when the steps of the assembly process are next described in more detail, it will be appreciated that the subassembly 12 of the present invention may be manufactured with or without an insulating member or coil support 20 located at the second axial end face 38 of the core 22.

The detailed sequence of steps in the method of assembly of the field subassembly 12 of the present invention are shown in FIGS. 14a through 14f. As illustrated in FIG. 14a, the coil supports 20 are positioned adjacent their respective core end faces 36, 38 so that the coil support mounting holes 50 are in registration with the respective core through-holes 42. This also will align the coil supporting portions 46 of the coil supports 20 with the respective pole pieces 40 in the stack 22, since, in the preferred embodiment, the coil support 20 is fabricated to locate the coil supporting portions 46 in a predetermined relationship with respect to the core 22. It will further align the terminal support portions 48 in any desired relationship to the core 22. As shown by arrows 71, the fasteners 61 are inserted through the mounting holes 50 of that coil support 20 located at the core second axial end face 38, and are pushed with an axial motion through the core and into the respective mounting holes 50 of the coil support 20 located adjacent the first axial end face 36, such that the fastener threaded portions 68 engage the mounting holes 50 with a press-fit. The fasteners 63 are further pushed until the headed ends 64 engage the coil support 20 (or the second axial end face 38 of the core 22 should only one coil support be used), so that part of the threaded portions 68 of the fasteners 63 extend axially outwardly from the coil support 20 adjacent the first core axial end face 36.

FIG. 14b shows the fasteners holding the coil supports against respective axial end faces of the core or stack 22. Now the core 22 may be provided with appropriate electrically-insulating material to electrically insulate the field windings 26 therefrom. The field coil wire 26 is then wound about each core pole piece 40 and its respective two adjacent coil support portions 46. Also illustrated in FIG. 14b is the step of inserting a field terminal 72 in the field terminal support portions 48 shown in FIGS. 2 and 5, again with an axial motion indicated by arrows 71. After the terminals 72 are inserted, the ends of each length of field coil wire 26 are attached to respective field terminals 72. Following this termination step, the adjacent loops of field coil wire are bonded together. (The bonding may typically be accomplished by passing an electric current through the field coil wires.)

FIG. 14c illustrates the next step in the method of assembly of the field subassembly of the present invention, in which the brush holder subassembly 24 is pushed axially onto the protruding fastener threaded portions 68, (again as illustrated by arrows 71). Here it may be recalled that the fasteners 61 also engage the brush holder subassembly mounting holes 56 with a press-fit. After this step is performed, the fasteners 61 are pushed in the reverse axial direction than that of the insertion step, (axially outwardly of the subassembly in a direction towards the core second axial end face) until the non-headed ends 66 of the fasteners 61 are substantially flush with the exterior surface 59 of the brush holder subassembly 24. Then, (FIG. 14e) the core subassembly 12 is aligned with the field case or field mounting member 14 such that the fasteners 61 are in registration with the field case mounting apertures 60. Note that in all of the preceding steps of interconnecting the core, the coil supports, fasteners, and brush holder subassembly, the subassembly elements were assembled using a single type of motion, namely, one in a direction parallel to the core axis 34. This method is therefore particularly adapted for automated assembly techniques, in which single-motion assembly processes are preferred.

The final field subassembly step is that of driving the fasteners into their respective field-mounting apertures using a conventional rotating or driving motion, as shown by arrows 73 in FIG. 14f. Thus, by using the same fasteners which maintain the coil supports in a predetermined relation to the stack for subsequent assembly operations, such as attaching the brush holder subassembly 24 as well as connecting the entire core subassembly 12 to the field case 14, the conventional steps of inserting various fasteners more than once into the subassembly are eliminated.

The fixture used in the steps of aligning the coil supports with the field core and for inserting the fasteners into the core subassembly is shown generally as 80 in FIG. 13. The fixture 80 includes a base plate 82 which supports two guide bars 84, a coil support alignment pocket 86, a mandrel 88 (in phantom) and two fastener clearance bores 90. A pressure plate 92 is slideably mounted on the guide bars 84 and carries two fastener pressors 94 which engage the fastener headed ends 64 to press the fasteners axially into the coil supports 20 and core 22.

To use the fixture 80, a coil support 20 is placed over the mandrel 88 and into the coil support alignment pocket 86 such that the terminal support portions 48 face downwardly. The lamination stack or core 22 is then placed over the mandrel 88, followed by the other coil support 20, this time positioned such that its terminal support portions 48 face upwardly with respect to the core 22. The mandrel 88 thus aligns the coil supports 20 with the core 22. A pair of fasteners 61 are then positioned in axial alignment with respective coil support mounting holes 56, and the pressure plate 92 is moved downwardly as shown by the arrows 90 until it reaches the position shown in phantom in FIG. 13. At this point the fastener headed ends 64 will have engaged the upper coil support and the fastener non-headed ends 66 will have extended outwardly from the lower coil support and into the fastener clearance bores 90 in the base plate 82. Then the pressure plate 92 is raised, the field subassembly 12 is removed and the procedure is repeated.

Having described the structure and method of assembly of the preferred embodiment, additional embodiments of the present invention will now be illustrated. Again referring to FIG. 5, a second embodiment includes the use of an adhesive applied (as at 96) to either or both of the coil support core-engaging surfaces 52, and their respective adjacent core axial end end faces 36, 38, such that the coil support 20 is maintained in the predetermined relation to the core 22 for at least one subsequent assembly operation, such as the winding step. The adhesive 96 may be used either in conjunction with the use of the fasteners 61 as was previously described, or the adhesive alone may be applied to the coil support 20 or the core 22, or both, at the beginning of the assembly process. In the latter case the fasteners 61 need not be inserted until the field is ready to be connected to the field case or field housing member 14, because the adhesive alone maintains the coil support 20 in relation to the core 22. The adhesive 96 is selected from any suitable group of high-strength, rapid-bonding adhesives suitable for quickly joining plastic and steel, such as the cyanoacrylate adhesives. After the adhesive is applied to the appropriate surfaces, a coil support core-engaging surface is joined to the first core axial end face 36 in a predetermined relationship. This is followed by the step of allowing the adhesive 96 to set so that the predetermined relationship is maintainable for at least one subsequent assembly step, such as winding the field. It should be noted that the use of adhesives as illustrated in this embodiment can be used to join both coil supports to the core 22. The remaining assembly steps parallel those discussed regarding the first embodiment of the present invention.

Figure 6:
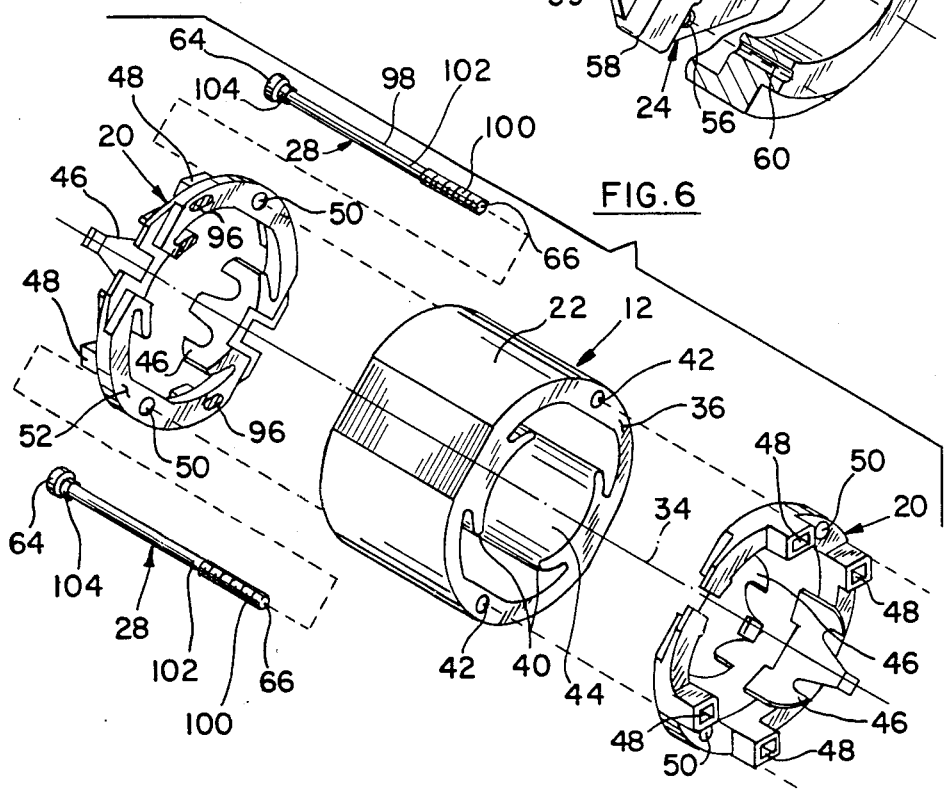
FIG. 6 is a exploded perspective detail view of the field subassembly of the present invention showing a third embodiment of the method for assembling the coil support to the ferromagnetic core using a different form of threaded fastener.

A third embodiment of the present invention is shown in FIG. 6. Fasteners 98 have a threaded portion 100 adjacent the non-headed ends 66, a shank portion 102 of smaller outer diameter than the threaded portion 100 intermediate the headed end 64 and the non-headed end 66, and an enlarged shank portion 104 adjacent the headed end 64 and having an outer diameter approximately equal to the outer diameter of the threaded portion 100. Thus when the fasteners 98 of this embodiment are inserted into the core subassembly 12, they provide sufficient aligning support at each coil support 20, and further provide clearance for that portion 102 of the fasteners to be located within the core 22.

A fourth embodiment is illustrated FIGS. 7, 8a, 8b, 9a, and 9b. In this embodiment, a fastener 106 is formed with a threaded portion 108 adjacent the non-headed end 66 and a reduced diameter shank portion 110 intermediate the threaded portion and the headed end 64. The threaded portion 108 has an outer diameter greater than the diameter of the coil support mounting hole 50 and less than that of the core through-holes 42. The coil support 20' is provided with fastener-compensating means 112 operatively associated with the coil-support mounting holes 50' for expanding the holes 50' to permit entry of the fastener threaded portion 108 into a respective coil support mounting hole 50', and to contract to engage the fastener shank portion 106 after entry by the fastener threaded portion 108. The fastener-compensating means 112 include a slot 114 formed in the coil support 20' intersecting respective coil-support mounting holes 50' (as shown in FIG. 7). In FIGS. 8a and 8b, the fastener-compensating sequence begins when the fastener threaded portion 108 engages the mounting hole 50' of the coil support 20' located adjacent the second core axial end face 38. The coil support 20', being molded of plastic, is resilient, such that when the fastener threaded portion 108 enters the mounting hole, the slot 112 and mounting hole 50' expand to permit its entry, thereby allowing the fastener threaded portion to enter the stack through-holes 42, as indicated by arrow 115 in FIG. 8b. FIGS. 9a and 9b show that after the enlarged diameter-threaded portion 108 has passed through the mounting hole 50', the material of the coil support 20' then contracts to grip the reduced diameter shank portion 110. Referring once again to FIGS. 7, 8a and 8b, it will be appreciated that when the fastener threaded portion 108 ultimately engages the coil support located adjacent the first axial end face 38, its coil-support mounting hole 50' and fastener-compensating means 114 will likewise expand to permit entry of the threaded portion 108 and will subsequently tightly grip the fasteners 106, thereby maintaining the coil supports 20' in the desired predetermined relationship with the core 22, and thereby again acting as a female fastener member, locking the fasteners 106 in position.

A sixth embodiment of the present invention is shown in FIGS. 11, 12, 15a and 15b. As shown in FIGS. 11 and 12, rivets 114 have shanks 116 whose mounting hole outer diameters are selected so that the rivets 114 engage the coil supports with a press-fit, yet will engage the core through-holes with a clearance fit. As shown in FIGS. 15a and 15b, and in a sequence similar to that shown in FIGS. 14a–14f, once the rivets 114 have been pressed into the core subassembly 12, the brush holder subassembly 24 is then pressed upon protruding portions 118 of the rivets 114 and the protruding portions 118 are then inserted into the respective mounting apertures 60 in the field housing member 14. Then the non-headed ends 66 of the rivets 14 are peened or flared against the field housing member 14. As shown in FIG. 15b, a steel back-up fixture 120 is placed against the rivet headed end 64. This supports the headed end as the rivet protruding portion 118 is peened or flared (the direction of force being indicated by the arrow 122 in FIG. 15b).

It will be understood that various changes in the details, materials, arrangements, method, parts and operating conditions which have been herein described and illustrated in order to explain the nature of the invention may be made by those skilled in the art within the principles and scope of the invention.

What is claimed is:

1. A method of assembling a field subassembly, comprising the steps of:
   (a) providing a ferromagnetic core having a longitudinal axis and defining an axial end face and two through-holes;
   (b) providing a first subassembly member having a core-engaging surface and further including two mounting holes operatively associated with the core through-holes;
   (c) applying an adhesive to at least one of the core axial end face and the core-engaging surface;
   (d) aligning the two mounting holes with respective core through-holes to attain a predetermined relationship between the core-engaging surface and the core axial end face;
   (e) joining the subassembly member core-engaging surface and the axial end face in said predetermined relationship;
   (f) providing two fasteners having a shank cross-sectional dimension smaller than that of the core through-holes and engageable with the mounting holes in a press-fit;
   (g) pushing the fasteners through the respective through-holes and mounting holes; and
   (h) Allowing the adhesive to set so that said predetermined relationship is maintainable for at least one subsequent assembly step.

2. The method claimed in claim 1, wherein:
   (a) the first subassembly member is a coil support;
   (b) the coil support defining a coil supporting portion; and further comprising the steps of:
   (c) providing a length of field coil wire; and
   (d) winding the wire about a portion of the core and the coil supporting portion after the adhesive sets.

3. The method claimed in claim 1, wherein:
   (a) said two fasteners extending from the first subassembly member; and further comprising the steps of:
   (b) providing a second subassembly member having electrically-conductive elements attached hereto and defining two mounting holes engageable with the fasteners; and
   (c) connecting the second subassembly member to the field subassembly by pushing the fasteners and the respective mounting holes of said second subassembly member into engagement.

4. The method claimed in claim 1, wherein the adhesive is a rapid-setting, high strength adhesive.

5. The method claimed in claim 4, wherein the adhesive is a cyanoacylate adhesive.

6. The method claimed in claim 1, wherein the adhesive is allowed to set so that the predetermined relationship is maintained through the completion of a step of winding the core with field coil wire.

7. The method claimed in claim 1, wherein:
   (a) the ferromagnetic core defines first and second axial end faces;
   (b) a pair of first subassembly members is provided, one for each axial end face; and
   (c) the steps of applying adhesive, joining a respective core-engaging surface to an axial end face, and allowing the adhesive to set are performed for each of the first and second axial end faces.

8. The method claimed in claim 7, wherein the adhesive is allowed to set so that the predetermined relationship is maintained through the completion of a step of winding the core with field coil wire.

9. The method claimed in claim 7, wherein:
   (a) each first subassembly member is a coil support;
   (b) each coil support defining a coil supporting portion; and further comprising the steps of:
   (c) providing a length of field coil wire; and
   (d) winding the wire about a portion of the core and a respective coil supporting portion after the adhesive sets.

10. The method claimed in claim 7, wherein at least one of the core axial end faces and first subassembly member core-engaging surfaces are uninterrupted by projections.

11. The method claimed in claim 10, wherein the first subassembly members are formed of electrically insulating material.

12. The method claimed in claim 11, wherein:
   (a) at least one of the first subassembly members further including a terminal support; and further comprising the steps of:
   (b) inserting an electric terminal in the terminal support; and
   (c) connecting one end of the field coil wire to the electric terminal.

13. The method claimed in claim 1, wherein the fasteners are pushed through the through-holes and mounting holes with a non-rotating axial motion.

14. The method claimed in claim 1, wherein:

(a) each fastener including a threaded portion adjacent an end thereof, and further comprising the steps of:

(b) expanding the mounting holes to permit entry of the fastener threaded portions into respective mounting holes; and (c) allowing the mounting holes to contract to engage the respective fastener shanks.

15. The method claimed in claim 9, wherein, prior to the step of winding, no means for connecting the insulating member to the core are employed other than adhesive means.

16. A method of assembling a field subassembly, comprising the steps of:

(a) providing a ferromagnetic core including two fasteners having exposed threaded portions formed thereon;

(b) providing a subassembly member having electrically-conductive elements attached thereto, and defining two mounting holes, said fastener exposed threaded portions being insertable, respectively, in said mounting holes;

(c) wherein the respective diameters of said fastener threaded portions and mounting holes are selected so that the act of inserting said fastener threaded portions into said mounting holes locks said fasteners in place in said subassembly member; and (d) inserting said fastener threaded portions into said mounting holes to connect said ferromagnetic core to said subassembly member.

17. A method of assembling a field subassembly, comprising the steps of:

(a) providing a ferromagnetic core including two fasteners;

(b) providing an field subassembly defining two mounting holes, said fasteners being insertable, respectively, in said mounting holes;

(c) wherein the respective diameters of said fasteners and mounting holes are selected so that the act of inserting said fasteners into said mounting holes locks said fasteners in place in said insulating member; and (d) inserting said fasteners into said mounting holes to connect said ferromagnetic core to said insulating member.

18. The method claimed in claim 17, further comprising the step of winding a length of field coil wire about said core and field subassembly member.

19. The method claimed in claim 18, wherein the field subassembly member is an insulating member.

* * * * *